United States Patent [19]

Opitz et al.

[11] 4,259,431
[45] Mar. 31, 1981

[54] METHOD FOR MAKING STATIONARY HEAT TRANSFER COEFFICIENT FIELDS VISIBLE BY PHOTOCHEMICAL MEANS

[75] Inventors: Heinrich Opitz, Erlangen; Bernhard Montag, Forchheim, both of Fed. Rep. of Germany

[73] Assignee: Siemens Aktiengesellschaft, Berlin and Munich, Fed. Rep. of Germany

[21] Appl. No.: 132,769

[22] Filed: Mar. 24, 1980

[30] Foreign Application Priority Data

Mar. 26, 1979 [DE] Fed. Rep. of Germany ....... 2911821

[51] Int. Cl.³ .................. G03C 5/26; G03C 5/24; G01M 9/00; G01D 9/00
[52] U.S. Cl. .................. 430/199; 430/341; 430/422; 430/434; 346/11; 73/147
[58] Field of Search .................. 73/147, 73, 168; 346/1.1; 430/434, 422, 347, 199

[56] References Cited

U.S. PATENT DOCUMENTS 3,774,225  11/1973  Kimmel et al. ............ 430/434
3,890,835  6/1975   Dötzer et al. ............ 430/434

Primary Examiner—Mary F. Downey
Attorney, Agent, or Firm—Kenyon & Kenyon

[57] ABSTRACT

Stationary heat transfer coefficient fields are made visible by applying a swelled photographic film (original wet film) in daylight to the article to be exposed to the flow. The wet film obtained after it is exposed to a gas flow and removed from the article, is squeezed onto an unexposed dry photographic film. The separated wet copy (latent image) is seeded with reactive gas ($H_2S$) to make the moisture profile visible, and is developed into a wet-copy photogram (black-and-white picture), the sharp contours of which (line equidensities, isohumids) can optionally be translated into colors, corresponding to the stationary mass transfer distribution, and with which definite heat transfer coefficients can thereby be correlated.

6 Claims, 2 Drawing Figures

METHOD FOR MAKING STATIONARY HEAT TRANSFER COEFFICIENT FIELDS VISIBLE BY PHOTOCHEMICAL MEANS

BACKGROUND OF THE INVENTION

The present invention relates to a method for making stationary heat transfer fields visible by photochemical means by applying a photographic film layer to the surface of an article and exposing the film layer by conducting a gas over it.

Methods are known for making stationary heat transfer zones visible which are based on the analogy between mass and heat transfer. An example of one such method is the so-called equidensity method using Agfa Contour Film ® (Kimmel, H. and Opitz, H., Siemens Review, Vol. XL, 6/73, pages 275 to 278). For this purpose, a uniformly moistened photo-gelatin layer is applied to the surface of an article to be investigated which is exposed to the flow of dry air thereover. As a result of evaporation to the flowing air, the film is transformed into locally different degrees of dryness corresponding to the stationary local state of the boundary layer flow.

From the residual quantities of liquid differently distributed locally in the photo-gelatin film after the exposure of the film to the flow, a photographic half-tone picture (photogram) can be developed, the density distribution of which represents the residual moisture distribution in the photo-gelatin layer due to the existence of a moisture-density curve. By reason of the above-mentioned analogy between the mass and heat transfer, the evaporated amounts of liquid represent a measure for the latter, and a definite local heat transfer coefficient can be correlated with a given local photographic density in the photogram. An absolute determination of the numerical values has not, however, been possible to date, i.e., one must still calibrate with physically determined values. The half-tone photogram obtained by the above-mentioned method represents the stationary mass transfer distribution of a planar subassembly as it is produced by the stationary thickness distribution of the Prandtl boundary layer, controlled by evaporation.

"Equidensity lines" can be constructed from half-tone photograms. "Equidensities" are areas or lines of equal, arbitrarily selectable photographic density tones which are displayed black on white or vice-versa. If these "equidensities" are given certain colors, the correlation of the equidensities among each other is facilitated substantially in complicated situations. The equidensities obtainable with wet-film techniques are lines (areas) of equal residual moisture, so-called "isohumids".

The equidensities are prepared by means of so-called "contour film" ® (Agfa). By varying the exposure time, the "window" in the contour film can be shifted over the entire density range of the half-tone original. Depending on the density steps (controllable by simultaneously copying a step grey wedge), several transparent equidensity separations are obtained in this manner which can be stacked with proper registration (sandwich assembly) and copied together. By chromogenic development of the black-and-white separations, color equidensities can be obtained as slides. However, the preparation of the equidensities by this method is time-consuming and requires the use of Agfa Contour Film ®.

SUMMARY OF THE INVENTION

An object of the invention is the pictorial display of stationary heat transfer coefficient fields in the form of equidensities, in which the noted shortcomings do not occur.

According to the invention, these and other objects are satisfied by providing that a swelled photographic film applied under illumination to the surface of an article to be examined, after being exposed to a flow of gas, is removed from the article, squeezed in darkness on an unexposed dry photographic film, separated therefrom after an appropriate dwelling time, and the wet copy obtained thereby "seeded" with a reactive gas to make the moisture profile visible and developed in a photographic developer according to known methods to form a wet-copy photogram. The wet-copy photograms can be prepared rapidly, since the method according to the invention furnishes line equidensities immediately. It is a further particular advantage of the invention that in a sequential process, stepped moisture profiles can be obtained by stepped flow-exposure times, the individual isohumids of which can be stacked to form isohumid families. The display becomes even more distinct if the boundaries for the heat transfer zones (isohumids) are represented by colored lines. The method according to the invention also permits the detection of very small differences in heat transfer zones. Information relating to the relative origin of the heat transfer zones and semi-quantitative information on the heat transfer coefficients is possible.

For swelling the photographic film, both water and mixtures of water and glycol in a ratio of maximally 10:1 parts, respectively, have been found to be particularly well suited.

Suitable reactive gases are sulfur-containing gases, particularly hydrogen sulfide.

DETAILED DESCRIPTION OF THE INVENTION

Figure 1:
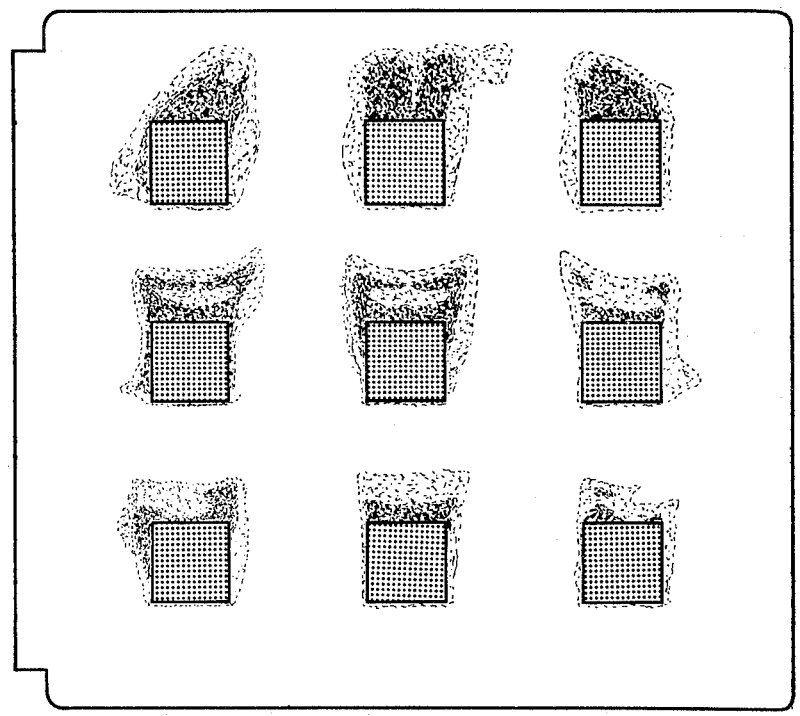
FIG. 1 shows isohumid contours obtained using the method of the present invention, constituting closed curves about transparent dry zones.

To carry out the method of the present invention, a wet-film photogram which has already been exposed in an air stream but has not been developed, can be transferred to an unexposed dry film by means of a calender or a press and both films separated after a dwelling time of about 30 seconds. In this operation, part of the residual-moisture profile of the original wet film passes into the photo gelatin layer of the initially dry film, converting the initially dry film to a wet copy. If the wet copy is then "seeded", preferably with $H_2S$ gas, so that only a latent image of the transferred residual moisture becomes visible, a black-and-white copy can be obtained on the wet copy after customary photographic development and fixation which shows a distinctive change of the density distribution from the developed wet-film original. Densities below 0.3 are suppressed and no longer displayed; in these ranges, the film becomes completely transparent, whereas the developed wet-film original in all ranges reproduces a density distribution analog to the moisture. The wet copy acts thus as a discriminator. The transparent dry zone obtained is furthermore delineated against the residually remaining half-tone regions by a substantially more dense but very narrow and sharp contour. The "isohumids contour" constitutes a closed curve about the transparent dry zones (FIG. 1).

The corresponding wet copies can be prepared in an analogous manner, starting with the highest moistures down to small residual moistures, corresponding to a density of about 0.3 of the wet film. The developed wet copies can be traced with ink on transparent drafting vellum individually along the isohumids contours. The individual black-and-white line copies can subsequently be converted by a color copying process (e.g., Agfa "Transparex ®", 3M Colorkey, Reguprint and others) into colored contours. Numerous colors can be chosen. The color film copies, stacked in registration, furnish a multi-colored transparent "isohumids sandwich".

An isohumids sandwich, in which several transparent colored isohumids contours are stacked on top of each other, represents the geometrical plot of the heat transfer zones as well as their quantitative sequence.

Figure 2:
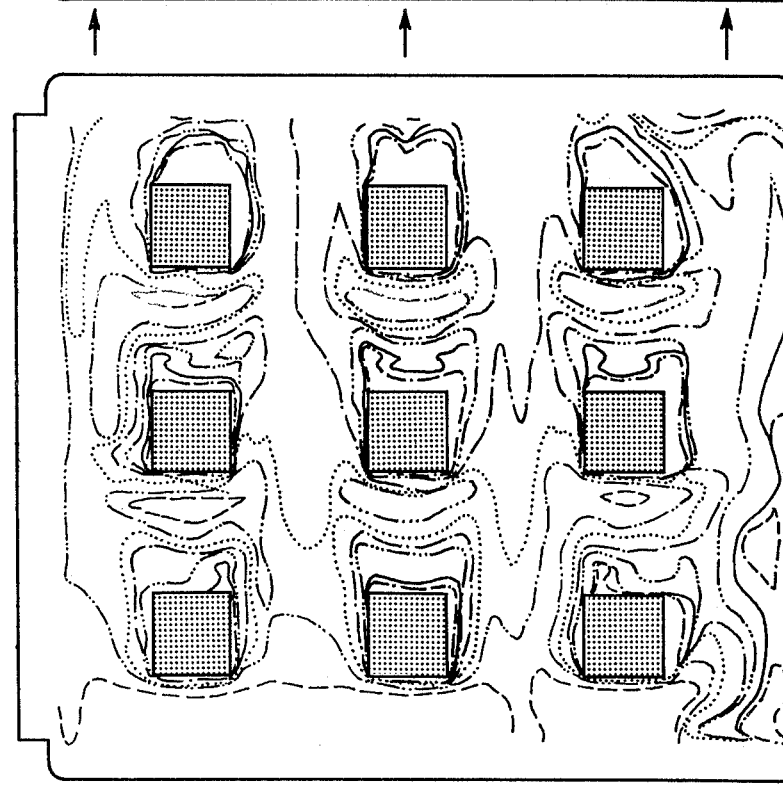
FIG. 2 shows a family of colored line isohumids obtained using the method of the present invention.

With the family of isohumids obtained by the method according to the invention, it is possible through correlation of a heat transfer coefficient to determine the other physical data by means of a calibration. Thus, colored line isohumids (FIG. 2) decode the distribution of the heat transfer zones cartographically. The order of the lines from lower to higher heat transfer coefficients is thus represented on a relative scale as follows:

| - - - - - | (black) | $= 1.0\alpha_0$ | · · · | (red) | $= 2.9\alpha_0$ |
|---|---|---|---|---|---|
| - | (purple) | $= 1.3\alpha_0$ | - - - - | (green) | $= 3.8\alpha_0$ |
| - - - - - | (yellow) | $= 1.7\alpha_0$ | - - | (blue) | $= 5.0\alpha_0$ |
| - - - | (orange) | $= 2.2\alpha_0$ | | | |

With the method according to this invention, the stationary heat transfer coefficient fields of heat exchangers, as well as other systems with forced gas cooling, can be determined.

The invention will be explained in greater detail by the following examples.

EXAMPLE 1

A photographic film (Agfa 023) is swelled in a water-glycol mixture (10:1 parts) for 3 minutes at a temperature of 10° C. in daylight. Excess liquid residues on the film are removed by squeezing. In this condition, the film is applied for exposure to the surface of an article to be exposed to the flow.

After an exposure time of several seconds in the steady-state air stream provided, the film is removed from the surface and is squeezed in darkness on an unexposed dry film. After a dwelling time of 30 seconds, the characteristic, invisible residual moisture distribution, which originally existed on the swelled film, is distributed equilibrium-wise on both films, converting the originally dry film to a wet copy of the original exposed film. The residual moisture profile then residing on the wet copy is seeded with $H_2S$ gas and subsequently processed with a standard photographic developer into a black-and-white film.

This wet-copy photogram shows a structure different from a residual-moisture profile which is prepared in accordance with German Pat. No. 2,133,834 and developed with $H_2S$ into a visible photogram of the residual moisture distribution. All photographic densities below 0.3 are suppressed. In addition, the wet copy prepared in accordance with the method of this invention is surrounded by a sharp contour, the so-called isohumids contour (FIG. 1).

EXAMPLE 2

With the same test conditions, the procedure is performed with methyl mercaptan as the reactive gas.

What is claimed is:

1. A method for making stationary heat transfer coefficient fields visible comprising:
   (a) providing a swelled photographic film layer;
   (b) applying said film layer to a surface of an article to be investigated;
   (c) exposing said film layer to a flow of gas to form an undeveloped wet-film photogram having a characteristic residual moisture profile;
   (d) removing said undeveloped wet-film photogram from the surface of the articles;
   (e) contacting said undeveloped wet-film photogram with an unexposed dry photographic film and maintaining such contact for a time sufficient to transfer at least part of the characteristic residual moisture profile from said wet film photogram to said dry film thereby converting said dry film into a wet copy of said wet film photogram;
   (f) separating said wet-film photogram and said wet copy;
   (g) contacting said wet copy with a reactive gas to make visible the residual moisture profile therein; and
   (h) developing and fixing said wet copy.

2. The method according to claim 2 wherein said swelled photographic film layer is prepared by swelling photographic film in a material selected from the group consisting of water and mixtures of water and glycol.

3. The method according to claim 2 wherein said mixtures of water and glycol contain no more than 10 parts water for every part of glycol.

4. The method according to claim 1 wherein said time of contacting the undeveloped wet-film photogram with the dry photographic film is about thirty seconds.

5. The method according to claim 1 wherein said reactive gas of step (g) is hydrogen sulfide.

6. The method according to claim 1 wherein said steps (a) through (h) are repeated at least one utilizing a different flow exposure time of gas against said film layer in step (c); wherein each of the developed wet copies resulting from each such process are treated to differently color the isohumids contour of each; and wherein the so-prepared wet copies are stacked in registration.

* * * * *